(12) United States Patent
Werner et al.

(10) Patent No.: US 9,015,474 B2
(45) Date of Patent: Apr. 21, 2015

(54) SYSTEMS AND METHODS FOR CREDENTIALING

(75) Inventors: Marc P. Werner, Stuttgart (DE); Martin Recker, Boeblingen (DE); Hans-Peter Schmollinger, Gaeriringan (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 13/812,590

(22) PCT Filed: Jul. 30, 2010

(86) PCT No.: PCT/US2010/044029
§ 371 (c)(1),
(2), (4) Date: Jan. 28, 2013

(87) PCT Pub. No.: WO2012/015441
PCT Pub. Date: Feb. 2, 2012

(65) Prior Publication Data
US 2013/0145156 A1 Jun. 6, 2013

(51) Int. Cl.
*H04L 29/06* (2006.01)
*H04L 9/32* (2006.01)

(52) U.S. Cl.
CPC ............ *H04L 9/3263* (2013.01); *H04L 9/3215* (2013.01)

(58) Field of Classification Search
CPC ..................... H04L 9/3263; H04L 9/3215
USPC .............................................. 713/156; 726/6
See application file for complete search history.

(56) References Cited

U.S. PATENT DOCUMENTS

| | | | |
|---|---|---|---|
| 7,225,331 B1* | 5/2007 | McBrearty et al. ........... | 713/158 |
| 7,660,420 B1* | 2/2010 | Narayan et al. .............. | 380/274 |
| 8,635,373 B1* | 1/2014 | Supramaniam et al. ...... | 709/248 |
| 2004/0131188 A1* | 7/2004 | Wang et al. .................. | 380/270 |
| 2005/0075986 A1 | 4/2005 | You et al. | |
| 2005/0268115 A1* | 12/2005 | Barde et al. .................. | 713/189 |
| 2007/0234432 A1* | 10/2007 | Korkishko et al. ............. | 726/27 |
| 2008/0134309 A1* | 6/2008 | Qin et al. ......................... | 726/6 |
| 2008/0209538 A1* | 8/2008 | Malakapalli et al. ........... | 726/12 |
| 2008/0256592 A1* | 10/2008 | Schnell et al. .................... | 726/1 |
| 2009/0307759 A1* | 12/2009 | Schnell et al. .................... | 726/4 |
| 2011/0283104 A1* | 11/2011 | Sangubhatla ................. | 713/168 |
| 2013/0286889 A1* | 10/2013 | Cherian et al. ................ | 370/254 |
| 2014/0031024 A1* | 1/2014 | Xie et al. ...................... | 455/418 |
| 2014/0173271 A1* | 6/2014 | Dadu et al. ................... | 713/153 |

FOREIGN PATENT DOCUMENTS

| | | |
|---|---|---|
| KR | 20010093453 A | 10/2001 |
| KR | 20030065624 A | 8/2003 |
| KR | 20070109040 A | 11/2007 |

OTHER PUBLICATIONS

Korean Intellectual Property Office, International Search Report, Apr. 27, 2011, 3 pages, Deejeon, Republic of Korea.

* cited by examiner

*Primary Examiner* — Michael Pyzocha
(74) *Attorney, Agent, or Firm* — Conley Rose, PC

(57) ABSTRACT

A method includes issuing non-unique credentials to an operations management agent ("the agent"). The method further includes establishing a first encrypted communication channel between an operations management server ("the server") and the agent based on the non-unique credentials. The method further includes issuing, automatically based on the establishing, unique credentials to the agent. The method further includes replacing, automatically based on the issuing of the unique credentials, the first encrypted communication channel with a second encrypted communication channel that is based on the unique credentials.

14 Claims, 4 Drawing Sheets

SYSTEMS AND METHODS FOR CREDENTIALING

BACKGROUND

Data center administrators strive for automation, including during system provisioning, because there are hundreds, if not thousands, of machines in use. Some machines are physical, e.g., blades, while others are virtualized using VMWare, Virtual Server, etc. The sheer number of machines prohibits individual installations of machines into the system. Instead, standardized templates are instantiated on machines to be installed, the templates usually pre-loaded with applications. However, use of templates creates a security problem because any attack that is successful against one machine will succeed for every machine that used the template. Additionally, once any machine is compromised, the entire system is at risk.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Figure 1A:
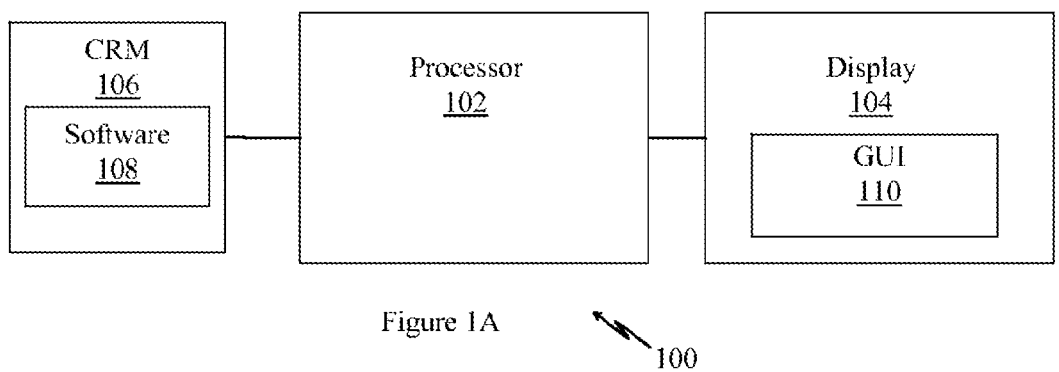
FIGS. 1A-1C illustrate a credentialing system in accordance with at least some illustrative embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " in all instances. Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

Illustrative systems, devices, and methods of credentialing are disclosed such that an operations management agent ("agent") software can be included in an operating system ("OS") template for provisioning purposes. Credentialing is authentication or authorization of software, hardware, or firmware on a network. A template is an image, or set of data, used as a pattern for efficient installation of software or firmware. An operations management server ("server") can be associated with an agent by managing the agent. The credentialing systems and methods disclosed allow customers to put newly installed agents immediately under management by a server, even if the associated server is not specified when the new agent starts up or comes online. If the agent software is part of the OS template, care should be taken that only authorized servers can take the agent under control. Whoever controls the agent controls the system; therefore, an unsecured agent is an open security hole. However, full automation of the server/agent association process is helpful due to the large number of machines. Solving this security/usability challenge is possible with the credentialing systems and methods disclosed herein. Both the existing management infrastructure and the new agent are fully protected against unauthorized access.

An operations management infrastructure comprises a server and a set of distributed agents. A server is software and computer hardware responsible for tasks such as data collection and aggregation in networks. In outsourcing scenarios, different companies can have their data collected and aggregated using one server even if firewalls, network address translators ("NATs"), hypertext transfer protocol ("HTTP") proxies, etc. are used. Additionally, a server can be used even if communication channels are restricted to outbound-only connections. An agent is software and computer hardware that monitors the network and reports such monitoring to the server. In order to have full access to data, e.g., log files, agents act with high-level privileges, e.g., root or system. Human operators use graphical user interfaces ("GUIs") connected to the network to view the managed environment.

FIG. 1A illustrates a system 100 of credentialing comprising a computer-readable medium 106 storing software 108 that, when executed by one or more processors 102, causes the processor 102 to perform any of the actions described in this disclosure. The software may be distributed among the hardware and processors on the system 100. The system 100 also comprises a GUI 110 displayed on display 104. In at least one embodiment, the GUI 110 is implemented by software 108. The processor 102, computer-readable medium 106, and display 104 may be local, i.e., on the same machine, or distributed, i.e., on different machines in any combination. In at least one embodiment, there is no GUI 110, display 104, or other human input device.

Figure 1B:
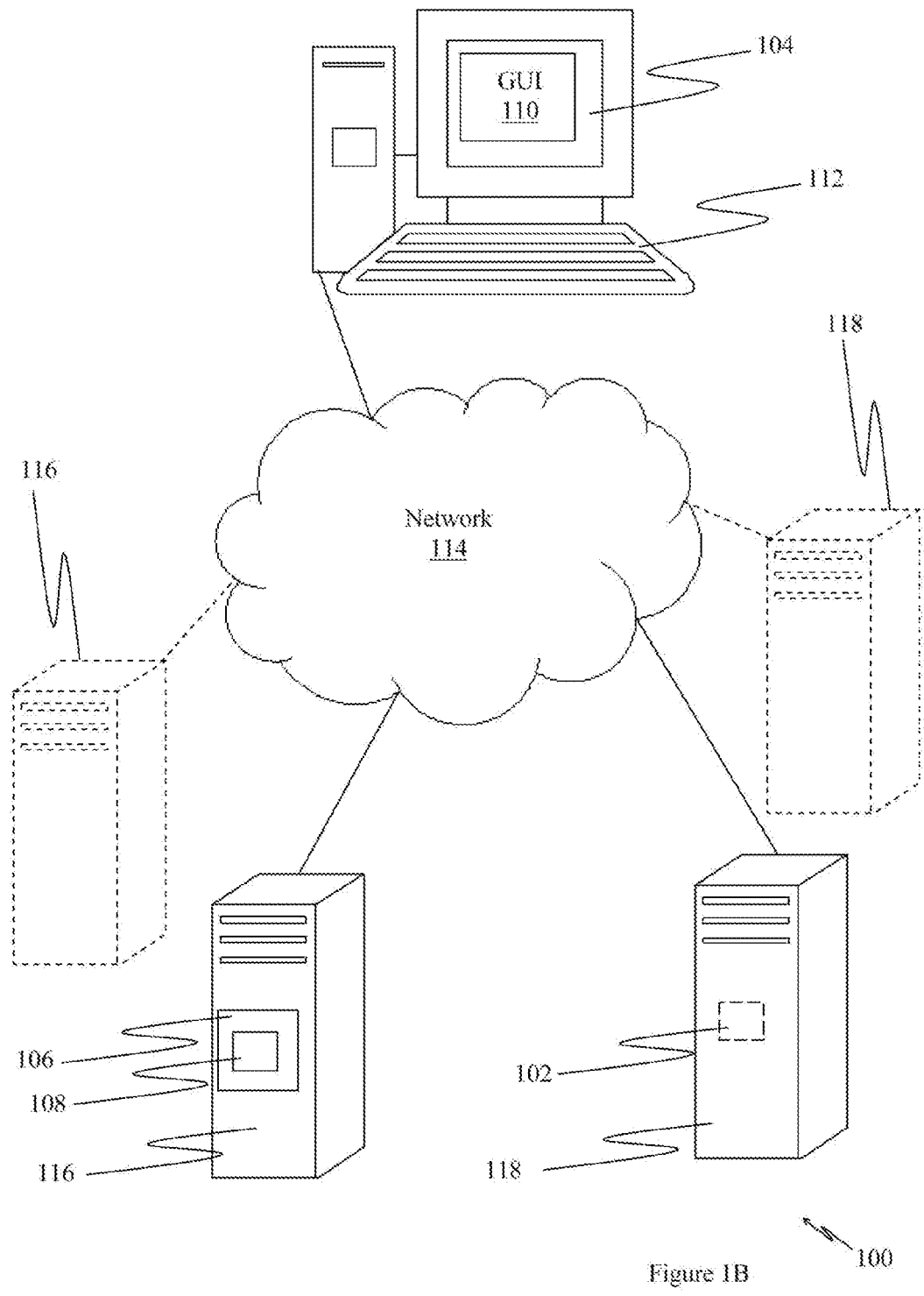
Figure 1C:
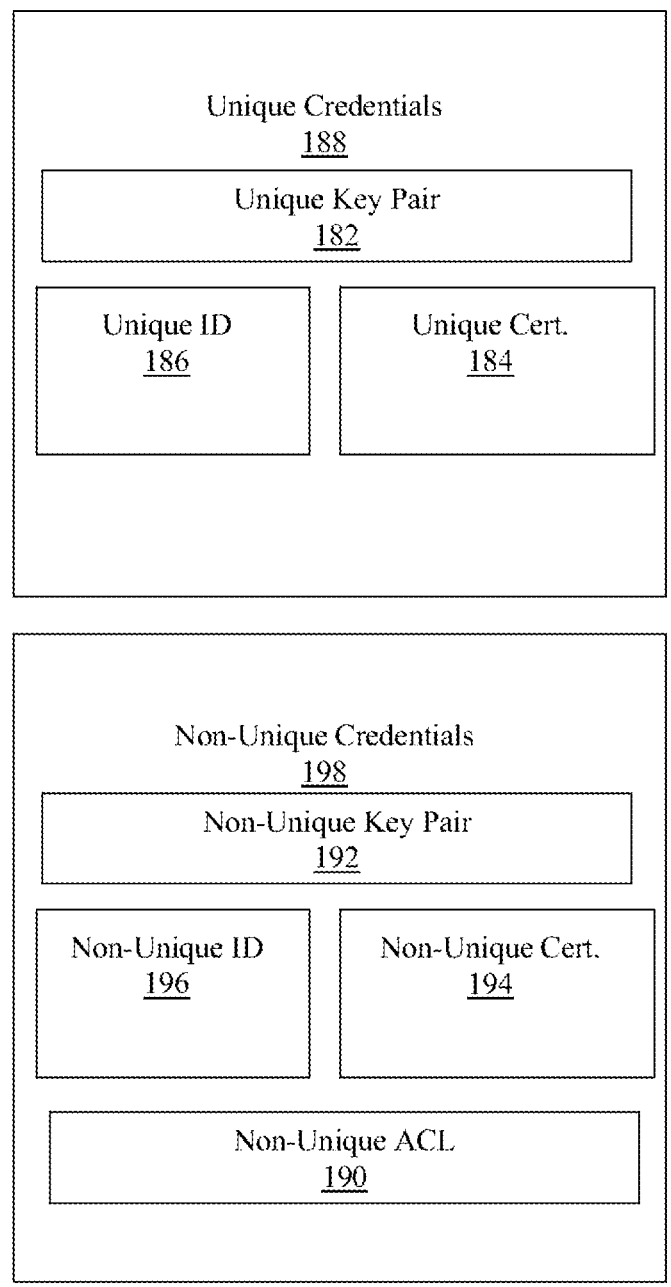

FIGS. 1B and 1C illustrate the system 100 in one embodiment of the distributed configuration. Specifically, the processor 102 couples to the computer-readable medium 106 over the network 114. In at least one embodiment, the network 114 is the Internet. The display 104 is a computer monitor, and a user can manipulate the GUI via the keyboard 112 and computer mouse or other type of pointing device (not shown) in at least one embodiment. The system 100 comprises an operations management agent 118. The agent 118 depicted can perform many other tasks in addition to its agenting tasks, but for ease of discussion the computer itself will be named according to its agenting tasks. The system 100 further comprises an operations management server 116 coupled to the agent 118. In at least one embodiment, the coupling is through network 114, making the agent 118 and the server 116 components of the network 114. The server 116 depicted can perform many other tasks in addition to its serving tasks, but for ease of discussion the computer itself will be named according to its serving tasks. The system may comprise any number of the components described, e.g., the system 100 may comprise multiple agents 118 and servers 116, each server 116 associated with a group of agents 118.

Because a template is used for installation, the agent 118 receives non-unique credentials 198. The non-unique credentials 198 comprise a non-unique identifier 196 and a non-unique certificate 194. In at least one embodiment, the non-unique credentials 198 also comprise a non-unique public/private key pair 192 or a non-unique access control list ("ACL") 190. A non-unique item can be used simultaneously in or by different network components, e.g., a non-unique identifier can be used simultaneously by different agents 118. An example of an identifier is d498f286-aa97-4a31-b5c3-806e384fcf6e. Certificates, signed by, e.g., 1024-bit keys allow for use of the Secure Socket Layer ("SSL") protocol with encryption for communication.

In at least one embodiment, the server 116 initiates establishment of the encrypted communication channel. For example, the server 116 initiates establishment as a result of the agent 118 startup, the agent's entrance to the network 114, etc. Establishment of the encrypted communication channel comprises authentication and authorization between the server 116 and the agent 118. Each server 116 can be securely authenticated through its certificate, and each agent 118 can be accessed via the same key. As such, each server 116 can store the private key to use for initial access to agents 118 for which the server 116 is associated. In at least one embodiment, the server 116 stores the private key, while the agent 118 stores the public key. The non-unique credentials 198 are trusted only for handshake interactions in at least one embodiment. The server 116 is authorized on the agent 118 via a server identifier. Accordingly, the private non-unique key provides authentication and authorizations. Although the server 116 initiates communication in at least one embodiment, in another embodiment, the agent 118 initiates communication. As such, the server identifier is compared with the ACL, which is part of the template from which the agent 118 was instantiated. Such comparison can be in based on a lookup table, a hashing algorithm, etc. Only a server 116 that presents a certificate bearing a server identifier compatible with the ACL is authorized. All servers 116 that are potential managers to the agent 118 are provided with the such certificates. As such, there are two steps for communication establishment, authentication and authorization. The associated server 116 issues unique credentials 188 to the agent 118 based on the establishment of the encrypted communication channel. Unique credentials 188 comprise a unique identifier 186 and a unique certificate 184. In at least one embodiment, unique credentials comprise a unique public/private key pair 182. A unique item is used only once in the network 114, e.g., a unique identifier 186 may be used by only one agent 118. The unique certificate 184 is signed by the server 116 in at least one embodiment. The server 116 and/or agent 118 replace, automatically (i.e., without human input) based on the issuing of the unique credentials 188, the encrypted communication channel with a second encrypted communication channel that is based on the unique credentials 188. In at least one embodiment the first encrypted communication channel is terminated and the second encrypted communication channel is established.

In at least one embodiment, the system 100 comprises a plurality of servers 116 coupled to the agent 118 or a plurality of agents 118. Each of the servers 116 comprises credentials compatible with the non-unique credentials 198. For example, each server 116 comprises a private key usable to communicate with a newly installed agent 118. In at least one embodiment, if the system 100 comprises a plurality of agents, each of the agents is issued the non-unique credentials 198 during installation of operations management software.

Figure 2:
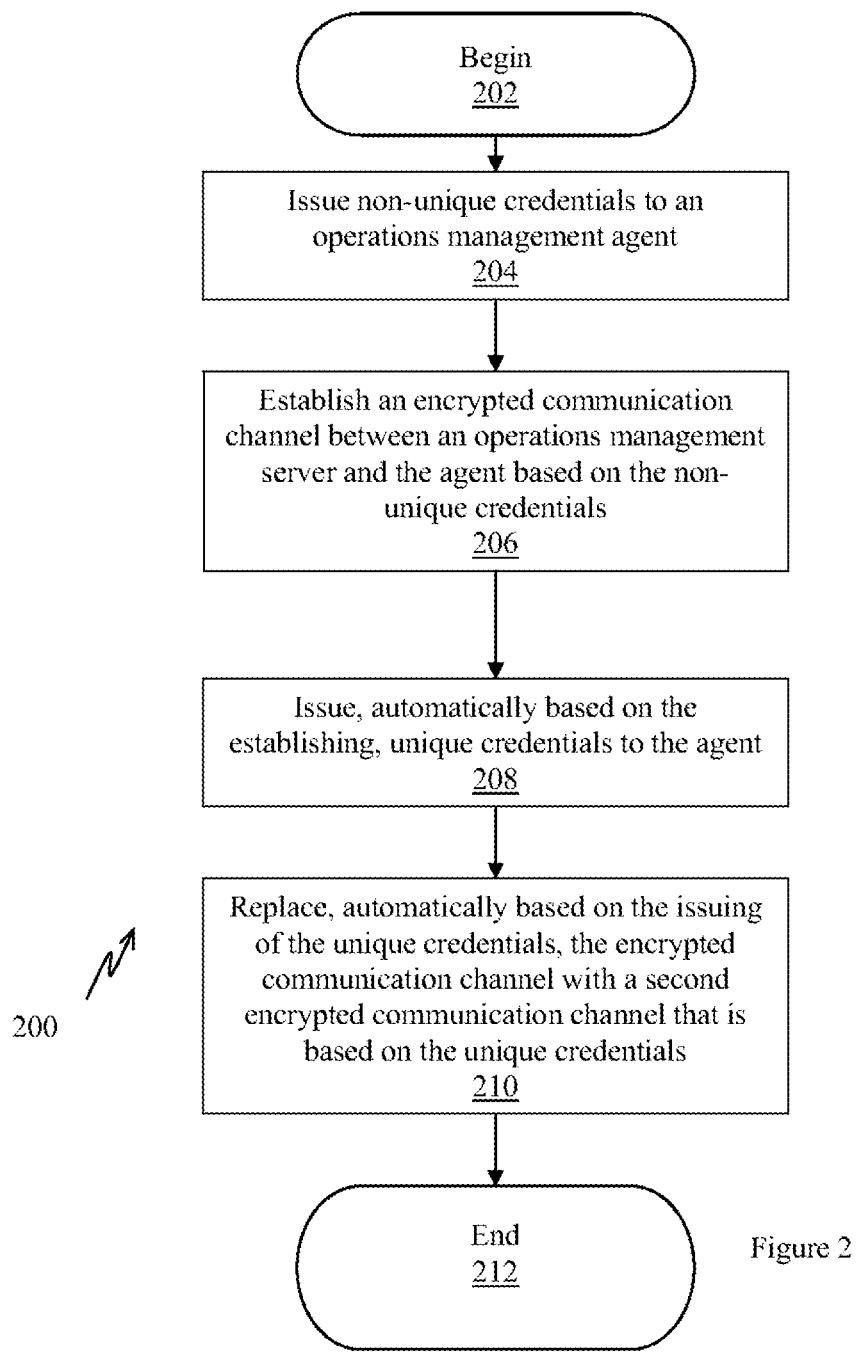
FIG. 2 illustrates a method of credentialing in accordance with at least some illustrative embodiments.

FIG. 2 illustrates a method of credentialing beginning at 202 and ending at 212. At 204, non-unique credentials 198 are issued to an operations management agent 118. The non-unique credentials 198 are issued during installation of operations management software onto the agent 118 in at least one embodiment. In at least one embodiment, the non-unique credentials 198 are issued during installation of the agent via the template. At 206, an encrypted communication channel is established between an operations management server 116 and the agent 118. The channel is based on the non-unique credentials 198, which are trusted only for handshake interactions in at least one embodiment. For example, the communication channel is encrypted using the agent's 118 private key and messages from the agent 118 are encrypted with the agent's 118 public key. The two keys form a public/private key pair, and the encryption algorithms for each key of the pair are mathematically related. In at least one embodiment, the server 116 initiates establishment of the encrypted communication channel. At 208, unique credentials 188 are issued to the agent issuing automatically, i.e., no human input is required, based on the establishment of the communication channel. The unique credentials 188 comprise a unique identifier and a unique certificate signed by the server 116 in at least one embodiment. At 210, the encrypted communication channel is replaced automatically, based on the issuing of the non-unique credentials 198, with a second encrypted communication channel that is based on the unique credentials 188.

The handshake interactions 206-210, i.e., establishing communication between a server 116 and an agent 118, can be enriched with further tasks that run on the server 116. For example, the agent 118 can be added to the server's 116 name service. The server 116 can also make other configurations: adding the agent to specific groups, informing other parties of the agent 118, fine-tuning the monitoring configuration of the network, or begin and end monitoring on other agents 118 because of the addition of the agent 118. If an agent 118 is managed by multiple servers 116 trust is established between two or more servers 116 so that their environments are able to communicate with each other.

Other conditions and combinations of conditions will become apparent to those skilled in the art, including the combination of the conditions described above, and all such conditions and combinations are within the scope of the present disclosure. Additionally, audio or visual alerts may be triggered upon successful completion of any action described herein, upon unsuccessful actions described herein, and upon errors.

The above disclosure is meant to be illustrative of the principles and various embodiment of the present invention. Numerous variations and modifications will become apparent to those skilled in the art once the above disclosure is fully appreciated. It is intended that the following claims be interpreted to embrace all variations and modifications.

What is claimed is:

1. A method, comprising
   issuing, by an operations management server, non-unique credentials to an operations management agent ("the agent"), wherein the non-unique credentials are only trusted for a handshake interaction that comprises establishing a first encrypted communication channel, wherein the non-unique credentials comprise a non-unique identifier and a non-unique certificate, and wherein the unique credentials comprise a unique identifier and a unique certificate signed by the operations management server;

establishing, by the operations management server, the first encrypted communication channel between the operations management server ("the server") and the agent upon issuing the non-unique credentials;

issuing, automatically by an operations management server, upon establishing the first encrypted communication channel, unique credentials to the agent; and replacing, automatically upon issuing of the unique credentials, the first encrypted communication channel with a second encrypted communication channel that is established utilizing the unique credentials.

2. The method of claim 1, wherein the non-unique credentials are issued during installation of operations management software onto the agent.

3. The method of claim 1, wherein establishing the first encrypted communication channel comprises authentication and authorization between the server and the agent.

4. The method of claim 3, wherein authentication is based on a public/private key pair.

5. The method of claim 3, wherein authorization is based on an access control list.

6. A system, comprising:

an operations management agent ("the agent") comprising instructions executable by a processor to receive non-unique credentials from an operations management server, wherein the non-unique credentials are only trusted for a handshake interaction that comprises establishing a first encrypted communication channel, wherein the non-unique credentials comprise a non-unique identifier and a non-unique certificate, and wherein the unique credentials comprise a unique identifier and a unique certificate signed by the operations management server;

the operations management server ("the server") coupled to the agent, the operations management server comprising instructions executable by a processor;

the server initiates establishment of a first encrypted communication channel between the server and the agent upon issuing the non-unique credentials;

the server issues, automatically upon establishment of the first encrypted communication channel, unique credentials to the agent; and the server and agent replace, automatically upon issuing of the unique credentials, the first encrypted communication channel with a second encrypted communication channel that is established utilizing the unique credentials.

7. The system of claim 6, further comprising a plurality of operations management servers ("the servers"), coupled to the agent, that each comprise credentials compatible with the non-unique credentials.

8. The system of claim 6, further comprising a plurality of operations management agents ("the agents") that are each issued the non-unique credentials during installation of operations management software.

9. The system of claim 6, wherein the server initiates establishment of the first encrypted communication channel as a result of startup of the agent.

10. A device, comprising:

an operations management server ("the server") comprising instructions executable by a processor;

the server issues non-unique credentials for establishment of a first encrypted communication channel, wherein the non-unique credentials are only trusted for a handshake interaction that comprises establishing a first encrypted communication channel, wherein the non-unique credentials comprise a non-unique identifier and a non-unique certificate, and wherein the unique credentials comprise a unique identifier and a unique certificate signed by the operations management server;

the server initiates establishment of the first encrypted communication channel upon issuing the non-unique credentials;

the server issues, automatically upon establishing of the first encrypted communication channel, unique credentials; and the server replaces, automatically upon issuing of the unique credentials, the first encrypted communication channel with a second encrypted communication channel utilizing the unique credentials.

11. The device of claim 10, wherein the server comprises a certificate acceptable to an access control list.

12. The device of claim 10, wherein the server comprises a public key that is part of a public/private key pair.

13. The system of claim 6, wherein based on the server and agent replacing the first encrypted communication channel with the second encrypted communication channel, the first encrypted communication channel is terminated.

14. The system of claim 8, wherein each of the plurality of agents is issued the non-unique credentials during installation of operations management software via a template.

* * * * *